United States Patent [19]
Hoyt et al.

[11] Patent Number: 4,956,210
[45] Date of Patent: Sep. 11, 1990

[54] FLEXIBLE FILM LAMINATES AND PACKAGING

[75] Inventors: John M. Hoyt; Joseph Fischer, both of Cincinnati, Ohio

[73] Assignee: Quantum Chemical Corporation, New York, N.Y.

[21] Appl. No.: 281,115

[22] Filed: Dec. 7, 1988

Related U.S. Application Data

[63] Continuation-in-part of Ser. No. 856,084, Apr. 25, 1986, abandoned, which is a continuation-in-part of Ser. No. 426,539, Sep. 29, 1982, abandoned, which is a continuation of Ser. No. 140,510, Apr. 15, 1980, abandoned.

[51] Int. Cl.$^5$ .................. B29D 22/00; B32B 1/08
[52] U.S. Cl. .................. 428/35.3; 428/35.9; 428/461; 428/463; 428/520; 428/412; 428/424.4; 428/476.1; 428/483; 426/127
[58] Field of Search .............. 428/35, 461, 520, 463, 428/35.3, 35.9

[56] References Cited

U.S. PATENT DOCUMENTS

| | | | |
|---|---|---|---|
| 3,616,191 | 10/1971 | Fuerholzer et al. | 525/61 |
| 3,882,259 | 5/1975 | Nohara et al. | 428/35 |
| 4,058,647 | 11/1977 | Inoue et al. | 428/474 |
| 4,064,296 | 12/1977 | Bornstein et al. | 428/35 |
| 4,143,790 | 3/1979 | Ueno et al. | 428/35 |
| 4,308,084 | 12/1981 | Ohtusuki et al. | 428/35 |
| 4,310,578 | 1/1982 | Katsura et al. | 428/35 |
| 4,311,742 | 1/1982 | Otsuka | 428/35 |
| 4,359,499 | 11/1982 | Akao et al. | 428/461 |

FOREIGN PATENT DOCUMENTS 1510115 5/1978 United Kingdom .

OTHER PUBLICATIONS

Ab, CA85(8): 47513q, JP50/37218, 12/1975, Mitsui Chem, "Adhesive Compositions for Thermoplastic Syn. Resin Laminates".

*Primary Examiner*—P. C. Sluby
*Attorney, Agent, or Firm*—Kenneth D. Tremain; Gerald A. Baracka

[57] ABSTRACT

The present disclosure is directed to a flexible delamination-resistant structure especially adapted for use in food packaging, such as in the construction of a retortable pouch. The structure comprises at least two adjacent films, at least one of which is aluminum, having interposed therebetween, as an adhesive for said films, a partially hydrolyzed ethylene-vinyl acetate copolymer obtained from the hydrolysis of from about 60 percent to about 80 percent of the vinyl acetate groups of an ethylene-vinyl acetate copolymer containing from about 30 percent to about 60 percent by weight of interpolymerized vinyl acetate.

14 Claims, No Drawings

FLEXIBLE FILM LAMINATES AND PACKAGING

REFERENCE TO RELATED APPLICATIONS

This is a continuation-in-part of U.S. patent application, Ser. No. 856,084 filed Apr. 25, 1986 now abandoned, which is a continuation-in-part of U.S. patent application, Ser. No. 426,539 filed Sept. 29, 1982, now abandoned, which is a continuation of U.S. patent application, Ser. No. 140,510 filed Apr. 15, 1980, now abandoned.

BACKGROUND OF THE DISCLOSURE

1. Field of the Invention

This invention relates to flexible film laminates and packaging and, in particular, retortable pouches for food manufactured therefrom.

2. Description of the Prior Art

Metals and plastics coated with partially hydrolyzed ethylene-vinyl acetate copolymers are well known. U.S. Pat. No. 2,490,550 describes the use of partially hydrolyzed ethylene-vinyl acetate copolymers as a heat sealing composition for use on flexible sheet materials such as paper, metal foil, regenerated cellulose film, cellulose acetate, ethyl cellulose and other transparent films. U.S. Pat. No. 3,382,092 describes metallic plate protectively coated with a hydrolyzed ethylene-vinyl acetate copolymer. According to U.S. Pat. No. 3,549,727, both the vinyl ester content of an ethylene-vinyl ester copolymer and the degree to which the copolymer is hydrolyzed influence the lap-shear and peel properties of the hydrolyzed resin. The hydrolyzed resins described therein are said to be useful for bonding polymeric films, metal foils, leather, cellulosic surfaces, etc. The product of this patent is an adhesive composition based on a blend of a hydrocarbon resin polymer and an ethylene-vinyl ester copolymer which has been hydrolyzed to at least 60 mole percent and which, prior to hydrolysis, contained about 5-25 mole percent copolymerized vinyl ester and about 75-95 mole percent copolymerized ethylene. U.S. Pat. No. 3,562,234 teaches the use of a partially hydrolyzed ethylene-vinyl acetate copolymer as a heat-sealing material for textiles, as an adhesive for bonding paper, wood and plastics and as a coating for articles, in particular, of metal. U.S. Pat. No. 3,585,177 discloses the use of a partially hydrolyzed ethylene-vinyl acetate copolymer as a barrier coating applied to such substrates as paper, corrugated board, laminated paper products, polymer films and related materials. Similarly, in accordance with U.S. Pat. No. 2,595,740, a partially hydrolyzed ethylene-vinyl acetate copolymer is applied as a barrier coating to a base thermoplastic resin such as polyolefin, polyester, polyamide, and the like, employing as a bonding agent an ethylene polymer or copolymer. U.S. Pat. No. 3,616,191 recites a method for obtaining improved adhesion of extruded olefin polymer coating materials to packaging material substrates wherein a partially hydrolyzed copolymer of an olefin and an ester of an unsaturated alcohol, such as partially hydrolyzed ethylene-vinyl acetate, is used as an adhesion improving primer coat. U.S. Pat. No. 4,058,647 sets forth a process for preparing a laminated resin product having high gas-barrier capability wherein a two layer laminate is formed without the aid of an adhesive composition. The layers of the laminate comprise (1) a modified polyolefin composition and (2) a gas-barrier resin layer selected from the group consisting of a polyamide, a thermoplastic polyester and a hydrolyzed ethylene vinyl acetate copolymer. U.K. Pat. No. 1,510,115 describes a laminate film useful as a backing board film in vacuum packaging comprising a substrate layer of polyethylene, polypropylene or polyamide; an oxygen barrier layer of at least 85% hydrolyzed ethylene-vinyl acetate and a heat sealable layer of a blend of ethylene-vinyl acetate and a wax. Finally, U.S. Pat. No. 4,135,026 discloses the use of partially alcoholyzed ethylene-vinyl acetate copolymer as a red meat film wrap.

SUMMARY OF THE INVENTION

In contrast to the coated metals and plastics referred to supra, none of which interpose a partially hydrolyzed ethylene-vinyl acetate having more than 40 weight percent or less than 85 weight percent of the vinyl acetate hydrolyzed between two films or foils of different materials such as, for example, aluminum and polyester, aluminum and polyolefin and polyester and polyolefin, the flexible laminate of the present invention comprises at least two adjacent films, at least one of which is aluminum, having interposed therebetween as a bonding agent, that is, an adhesive, for said films, a partially hydrolyzed ethylene-vinyl acetate copolymer obtained by hydrolyzing from about 60 percent to about 80 percent of the vinyl acetate groups (VA) of an ethylene-vinyl acetate copolymer containing, prior to hydrolysis, between about 30 percent to about 60 percent by weight of interpolymerized VA.

By percent hydrolysis is meant 100 times the fractional degree of hydrolysis, x, performed on a weight, W°, of an ethylene-vinyl acetate copolymer taken for hydrolysis that contains VA° weight percent combined vinyl acetate. VA° is determined by saponification. The percent residual vinyl acetate content of the partially hydrolyzed ethylene-vinyl acetate copolymer, RVA, also determined by saponification, is related to x by the following formula:

$$RVA = \frac{W°VA°(1-x)}{W°(1-VA°/100) + W°VA°(1-x)/100 + 44.05\ W°VA°x/8{,}609}$$

which can be simplified to:

$$x = \frac{100\,(VA° - RVA)}{100\,VA° - 0.488\,VA°\,RVA}$$

It is assumed that all the ethylene in the ethylene-vinyl acetate copolymer is present in the hydrolyzed polymer and that all the vinyl acetate present in the original ethylene-vinyl acetate copolymer is also present in the hydrolyzed polymer, either as vinyl acetate or as vinyl alcohol units.

Since it is often desirable to combine the properties inherent in several different polymer films or even one or more polymer films with one or more non-polymer films to attain characteristics which are unavailable in the individual component films, an adhesive which can be used to bond various films, which normally present adhesion problems, is clearly desirable. Among the materials currently of interest is aluminum foil or aluminum film, which is difficult to combine with itself and with other commonly available, less expensive polymer films such as polyethylene.

For optimum adhesion it is necessary to have both hydroxy and acetoxy groups present in sufficient amount as are found in the particular partially hydrolyzed ethylene-vinyl acetate copolymers of the present invention. Substantially full hydrolyzed ethylene-vinyl acetate copolymers do not have adequate adhesion and unhydrolyzed ethylene-vinyl acetate copolymers alone have very low temperature softening points and would not be, in most cases, form-stable at room temperature or higher. By properly selecting both the particular ethylene-vinyl acetate copolymer and the degree of hydrolysis of the copolymer within the scope of the present invention, one can combine heat resistance, good adhesive performance, non-toxicity and clarity in one easily extrudable adhesive.

The laminates herein, in exploiting the superior bond strengths of partially hydrolyzed ethylene-vinyl acetate copolymers of the aforesaid type for mutually bonding dissimilar materials, make it possible to utilize the particular properties of different types of materials to good advantage, especially for food and beverage packaging applications.

Retortable pouches which permit foods to be stored without refrigeration have been recently introduced into the marketplace (viz., Peters, J. W., "Retail Debut of Retort Pouch Earns Consumer Acceptance," *Food Product Development*, March, 1975; Gerrish, S. L., "Retortable Pouches Get Their Chance Here," *Modern Packaging*, February, 1975; "FDA Evaluating Morton Chemical Adhesive; Approval of Retortable Pouch Nears," *Food Engineering*, February, 1976; "Alternate Pouch Zips by FDA, USDA, as Food Firms Eye its Potential," *Food Engineering*, July, 1977; and "Food Packaging and Labeling," *Food & Nutrition Press Newsletter*, August, 1977).

In a common type of construction, the retortable pouch is fabricated with a three-ply laminate of polyester film as the outer layer, aluminum foil as an intermediate component and a stable inert thermoplastic resin such as polybutene or polyethylene as the inner layer. In this construction a thermosetting polyurethane or epoxy adhesive is employed to bond the layers. Food inserted in the pouch and sealed therein is sterilized by retorting by much the same procedure used for canned foods, e.g., from about 10 minutes to about 30 minutes or more at temperatures on the order of from about 250° C. to about 270° F. Under these conditions, it has been observed that adhesives currently used to bond the individual laminate components have a tendency to migrate through the inner thermoplastic resin layer and into the food contained in the pouch giving rise to doubts regarding the safety of these packaging devices. However, since a partially hydrolyzed ethylene-vinyl acetate copolymer is non-toxic any minor amount of the copolymer which may migrate into the interior of pouches of this invention is no cause for concern.

DESCRIPTION OF THE PREFERRED EMBODIMENTS

The laminates herein possess at least two adjacent layers of different materials one of which is aluminum and the other of which can be a thermoplastic polymer. The thickness of each layer can vary over fairly wide limits, with thicknesses of from 0.1 mil to about 10 mils or greater being entirely suitable. Among the thermoplastic resins which can be used are olefin homopolymers and copolymers such as polyethylene, polypropylene, polybutene, polybutadiene, ethylene-propylene copolymer; ethylene-vinyl ester copolymers, especially ethylene-vinyl acetate copolymer; fully hydrolyzed ethylene-vinyl acetate copolymers; ionomeric resins; polyesters such as polyethylene terephthalate and polybutylene terephthalate; polyamides (nylons); polycarbonates; copolymers of ethylene and acrylate esters such as methyl methacrylate, methyl acrylate and ethyl acrylate; polyvinyl halides, especially polyvinyl chloride, polyvinyl fluoride and polytetrafluoroethylene; polysulfones; polyphenylene oxides; thermoplastic polyurethanes; and copolymer and blends of the foregoing.

Partially hydrolyzed ethylene-vinyl acetate copolymers (EVA), useful in the present invention, are obtained by the hydrolysis of from about 60 percent to about 80 percent. More preferably, from about 60 percent to about 75 percent of the vinyl acetate groups of an EVA copolymer containing from about 30 percent to about 60 percent, preferably, from about 40 percent to about 60 percent, and more preferably, from about 40 percent to about 50 percent by weight of inter-polymerized vinyl acetate, are hydrolyzed.

Any of the methods of hydrolyzing ethylene-vinyl acetate copolymer heretofore known can be used in the preparation of the partially hydrolyzed ethylene-vinyl acetate copolymer adhesives herein. Usually, the hydrolysis of ethylene-vinyl acetate copolymer is accomplished by the process of alcoholysis or transesterification in an alcoholic medium in the presence of an acid or basic catalyst. Hydrolysis can be accomplished by alcoholysis in solution or in the swollen solid phase. It can also be accomplished by saponification in aqueous dispersion. The laminates herein can be produced in various known and conventional ways with coextrusion of the thermoplastic layers and the adhesive and melt extrusion of a thermoplastic layer and adhesive upon aluminum being particularly convenient.

By way of demonstrating the superior T-peel bond strength provided by the partially hydrolyzed ethylene-vinyl acetate copolymer adhesives of the present invention for various substrates, comparison was made between the T-peel bond strengths of several substantially fully hydrolyzed copolymers of ethylene and vinyl acetate and the T-peel bond strengths of the partially hydrolyzed ethylene-vinyl acetate copolymers herein applied to identical substrate specimens. The results are reported below in Table 1.

TABLE 1

| Substrate | Original Weight Percent of Inter-Polymerized Vinyl Acetate | Substantially Fully Hydrolyzed Copolymer T-Peel Bond Strength, lb/in. | Partially Hydrolyzed Copolymer (12-13 weight percent residual interpolymerized vinyl acetate) T-Peel Bond Strength, lb/in |
|---|---|---|---|
| Aluminum | 26 | 0.6 | — |
| | 30 | 1.4 | 11.8 |
| | 40 | 2.6 | 18.8 |
| | 50 | 7.8 | 23.9 |
| Polyamide | 28 | — | 0.76 |
| | 40 | 0.37 | 2.6 |
| | 50 | 1.2 | 9.2 |
| Polyester | 28 | — | 0.75 |
| | 40 | 0.6 | 2.7 |
| | 50 | 0.9 | 10.5 |

As the above data show, a very substantial increase in bond strength is observed with the partially hydrolyzed ethylene-vinyl acetate copolymers of the present invention as compared to fully hydrolyzed ethylene-vinyl acetate copolymers, on both polyamide and polyester.

Another test was conducted to establish the optimum minimum degree of hydrolysis for ethylene-vinyl acetate copolymers. This test, involving the film substrates tested in Table 1, aluminum, polyester and polyamide, comprised sandwiching partially hydrolyzed ethylene-vinyl acetate between two films of each of the substrates. Four partially hydrolyzed ethylene-vinyl acetate copolymers were tested in accordance with this procedure. The copolymers were as follows: an EVA containing 27% VA, 40% hydrolyzed; an EVA containing 27% VA, 60% hydrolyzed; an EVA containing 44% VA, 40% hydrolyzed; and an EVA containing 44% VA, 60% hydrolyzed. Each so-formed sandwich was tested to determine its T-peel strength, in pounds per inch. The results of these tests are reported in Table 2.

TABLE 2

| Substrate | % VA in EVA | % Hydrolysis | T-Peel Strength, lb/in |
|---|---|---|---|
| Aluminum | 27 | 40 | 19.1 |
|  | 27 | 60 | 33.8 |
|  | 44 | 40 | 44.2 |
|  | 44 | 60 | 52.1 |
| Polyester | 27 | 40 | 2.3 |
|  | 27 | 60 | 0.54 |
|  | 44 | 40 | 5.8 |
|  | 44 | 60 | 2.3 |
| Polyamide | 27 | 40 | 0.85 |
|  | 27 | 60 | 0.60 |
|  | 44 | 40 | 4.02 |
|  | 44 | 60 | 2.54 |

The results summarized in Table 2 establish that the bond obtained utilizing a 40% hydrolyzed ethylene-vinyl acetate copolymer, a level known in the prior art, does not produce a result nearly as satisfactory a bond to aluminum as that obtained when the degree of hydrolysis is raised to the minimum level of the present invention. This result is applicable over a wide range of vinyl acetate concentration in the ethylene-vinyl acetate copolymer, as evidenced by its applicability at vinyl acetate weight concentrations of 27% and 44%.

The above embodiments and examples are given to illustrate the scope and spirit of the present invention. These embodiments and examples will make apparent, to those skilled in the art, other embodiments and examples. These other embodiments and examples are within the contemplation of the present invention. Therefore, the instant invention should be limited only by the appended claims.

What is claimed is:

1. A flexible delamination-resistant structure which comprises at least an aluminum film adjacent a thermoplastic polymeric film having interposed therebetween an adhesive for said films consisting essentially of a partially hydrolyzed ethylene-vinyl acetate copolymer obtained from the hydrolysis of from about 60 to about 80 percent of the vinyl acetate groups of an ethylene-vinyl acetate copolymer containing from about 30 to about 60 percent by weight of interpolymerized vinyl acetate.

2. A delamination-resistant structure in accordance with claim 1 wherein said partially hydrolyzed ethylene-vinyl acetate copolymer contains from about 40 percent to about 60 percent by weight of interpolymerized vinyl acetate.

3. A delamination-resistant structure in accordance with claim 2 wherein said partially hydrolyzed ethylene-vinyl acetate copolymer contains from about 40 percent to about 50 percent by weight of interpolymerized vinyl acetate.

4. A delamination-resistant structure in accordance with claim 2 wherein said partially hydrolyzed ethylene-vinyl acetate copolymer is obtained by the hydrolysis of from about 60 to about 75 percent of the vinyl acetate groups of said ethylene-vinyl acetate copolymer.

5. A delamination-resistant structure in accordance with claim 3 wherein said partially hydrolyzed ethylene-vinyl acetate copolymer is obtained by the hydrolysis of from about 60 to about 75 percent of the vinyl acetate groups of said ethylene-vinyl acetate copolymer.

6. A retortable pouch fabricated of the flexible delamination-resistant structure of claim 1.

7. A retortable pouch in accordance with claim 6 in which an aluminum film is bonded on at least one side to a thermoplastic film.

8. A retortable pouch in accordance with claim 6 wherein said partially hydrolyzed ethylene-vinyl acetate copolymer contains from about 40 to about 60 percent by weight of interpolymerized vinyl acetate.

9. A retortable pouch in accordance with claim 8 wherein said partially hydrolyzed ethylene-vinyl acetate copolymer contains from about 40 to about 50 percent by weight of interpolymerized vinyl acetate.

10. A retortable pouch in accordance with claim 8 wherein said partially hydrolyzed ethylene-vinyl acetate copolymer is obtained by the hydrolysis of from about 60 to about 75 percent of the vinyl acetate groups of said ethylene-vinyl acetate copolymer.

11. A retortable pouch in accordance with claim 9 wherein said partially hydrolyzed ethylene-vinyl acetate copolymer adhesive is obtained by the hydrolysis of from about 60 to about 75 percent of the vinyl acetate groups of said ethylene-vinyl acetate copolymer.

12. A retortable pouch comprising a flexible three-ply delamination-resistant structure, said structure including an outer thermoplastic film ply, an intermediate aluminum film ply and a stable inert thermoplastic film ply, said structure further including a partially hydrolyzed ethylene-vinyl acetate copolymer adhesive, obtained from the hydrolysis of from about 60 to about 80 percent of the vinyl acetate groups of an ethylene-vinyl acetate copolymer containing from about 30 to about 60 percent by weight of interpolymerized vinyl acetate, disposed between said plies.

13. A retortable pouch in accordance with claim 12 wherein the partially hydrolyzed ethylene-vinyl acetate copolymer adhesive is obtained from the hydrolysis of from about 60 to about 75 percent of the vinyl acetate groups of an ethylene-vinyl acetate copolymer containing from about 40 to about 60 percent by weight of interpolymerized vinyl acetate.

14. A retortable pouch in accordance with claim 12 wherein the partially hydrolyzed ethylene-vinyl acetate copolymer adhesive is obtained from the hydrolysis of from about 60 to about 75 percent of the vinyl acetate groups of an ethylene-vinyl acetate copolymer containing from about 40 to about 50 percent by weight of interpolymerized vinyl acetate.

* * * * *